J. S. Lash,
Clothes Wringer,
No. 2052. Reissued Aug. 15, 1865.
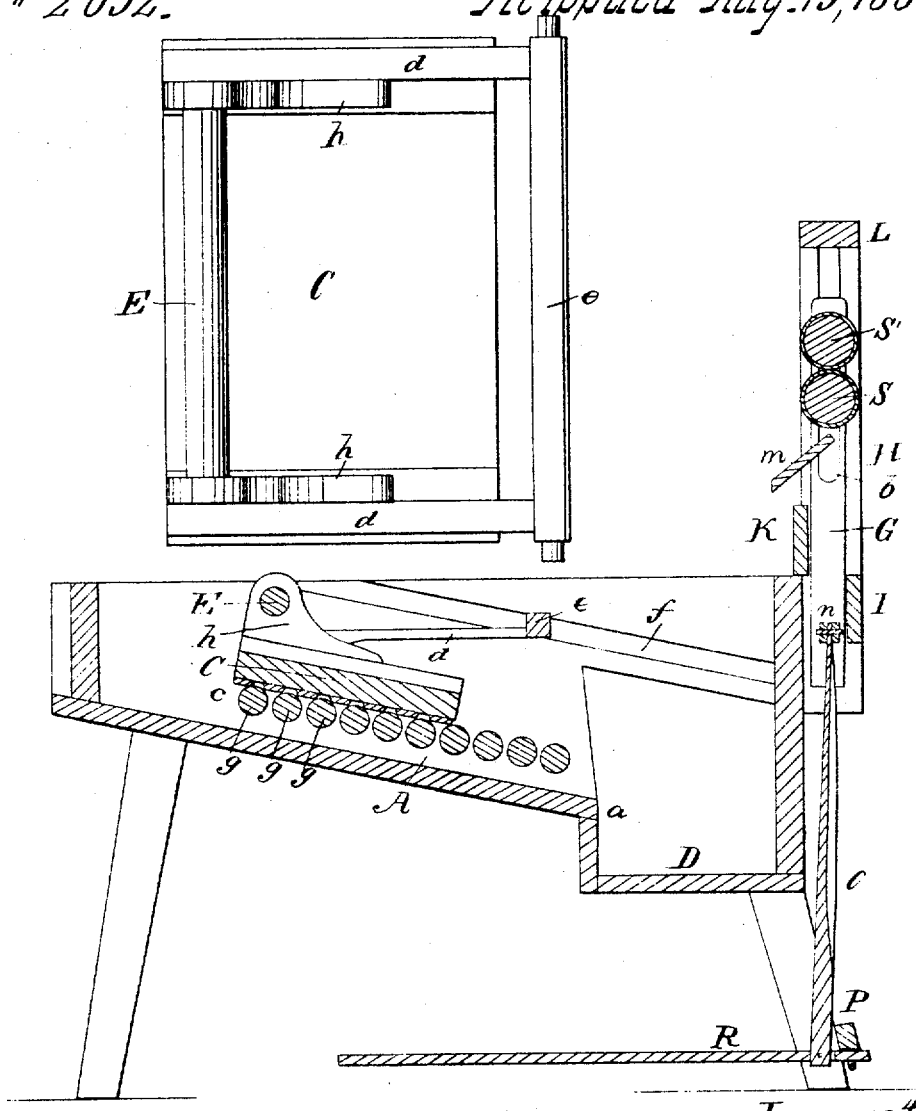
Witnesses;
Chas. Alexander
J. C. Clayton
Inventor;
John S. Lash
Per
J. H. Alexander
Atty.

UNITED STATES PATENT OFFICE.

JOHN S. LASH, OF PHILADELPHIA, PENNSYLVANIA.

WRINGING-MACHINE.

Specification forming part of Letters Patent No. 36,658, dated October 14, 1862; Reissue No. 2,052, dated August 15, 1865.

DIVISION B.

*To all whom it may concern:*

Be it known that I, JOHN S. LASH, formerly of Carlisle, Cumberland county, Pennsylvania, but now of the city of Philadelphia, and State aforesaid, have invented a new and useful Improvement in Machines for Washing and for Wringing Clothes; and I do hereby declare the following to be a full, clear, and exact description of the same, reference being had to the accompanying drawings, making a part of this specification, in which—

Figure 1 represents a longitudinal vertical section through the machines. Fig. 2 represents a top plan of the wash-board removed from the wash-box.

Similar letters of reference, where they occur in the separate drawings, denote like parts of the machines in both of the figures.

The nature of this part of my invention consists in the combination and arrangement of parts for forming a wringing-machine, consisting of an outer stationary and an inner movable frame, each frame carrying a roller, the movable frame, by means of a treadle, bringing its roller in contact with the roller of the permanent frame with sufficient force to squeeze the water from the clothes as they are passed between the rollers.

For convenience I have represented the wringing-machine as connected to a washing-machine; but the operation or use of one does not require the operation or use of the other, each being independent of the other, so much so that they need not be in the same room or used at the same time.

To enable others skilled in the art to make and use my invention, I will proceed to describe the same with reference to the drawings.

The frame of the wringing machine consists, mainly, of two upright posts, H, (one only being seen in the section, Fig. 1,) bound together at the top by the cross-ties L above the rollers and by the cross-ties K and I below them. Inside of the uprights, and moving against their inner faces, is a gate or movable frame, G, which is kept in position by the uprights and by the lap or shoulders in the ends of the inclined dripping-board *m*, which is designed for carrying away the water pressed from the clothes. The sides of the gate have long openings or slots *b* cut through them, and extending far enough beneath and above the rollers S′ S to allow the former, S′, to move up and down as it adapts itself to the clothes passing between it and the under roller, S. The journals of the roller S pass through the slots *b* of the gate, and are supported in the uprights H, while the journals of the roller S′ are supported in the gate, but also pass through slots in the uprights, and thus, while the roller S′ is free to rise and fall, its journals, as well as those of the roller S, mutually tend to keep the gate and frame in proper working position in relation to each other.

The cross-bar *n* connects the sides of the gate together at its lower end, and to this bar the pitman O is fastened, said pitman extending downward below the cross-tie P, where it is pivoted to the lever R. The cross-tie P serves as a fulcrum for the lever R, by which the gate and its roller are raised up or drawn down at pleasure and with such force as may be required.

A crank or winch may be placed on one end of the roller S, by which it may be turned, and also give motion to the upper roller when pressure is applied to the latter through the lever R.

Having thus fully described my invention, what I claim in this application, and desire to secure by Letters Patent, is—

In combination with a permanent frame carrying one roller, a vertically-moving gate carrying another roller, the journals of said rollers mutually passing through slots in the frame and gate, to keep them in proper working position, and said gate being moved and held down to bring its roller in close working contact with the frame-roller by means of a lever and pitman, as herein described and represented.

JOHN S. LASH.

Witnesses:

JOHN SPAHR,

M. HOLCOMB.